No. 777,265. PATENTED DEC. 13, 1904.
C. A. SMITH.
FAUCET.
APPLICATION FILED FEB. 20, 1904.
NO MODEL.
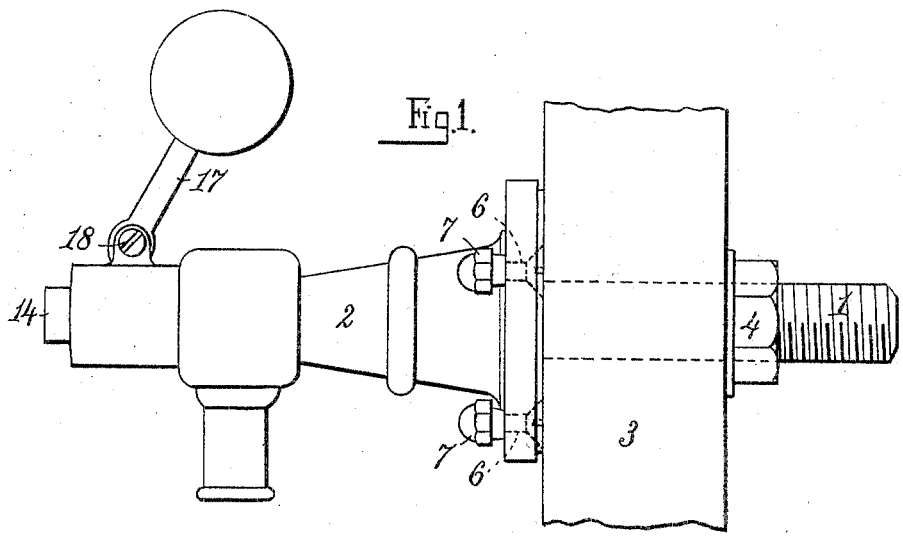
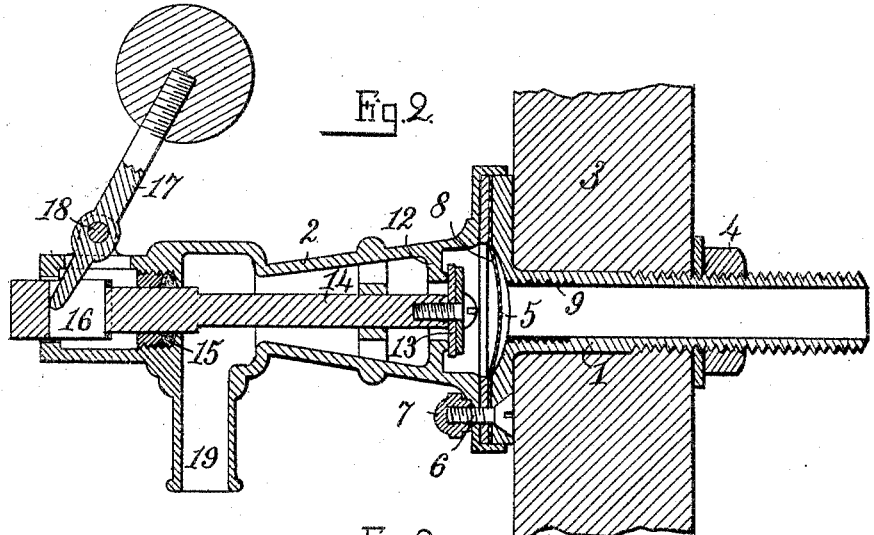
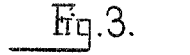
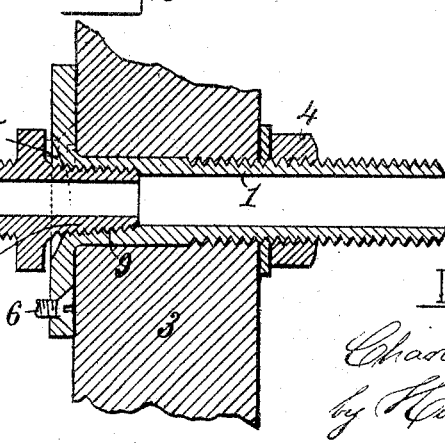
Witnesses.
Lauritz N. Möller
Anna B. Hammerich
Inventor.
Charles A. Smith
by Henry Chadbourn
his atty.

No. 777,265.

Patented December 13, 1904.

UNITED STATES PATENT OFFICE.

CHARLES A. SMITH, OF BOSTON, MASSACHUSETTS, ASSIGNOR OF ONE-THIRD TO JOHN J. KILBRIDE, OF BOSTON, MASSACHUSETTS.

FAUCET.

SPECIFICATION forming part of Letters Patent No. 777,265, dated December 13, 1904.

Application filed February 20, 1904. Serial No. 194,589. (No model.)

*To all whom it may concern:*

Be it known that I, CHARLES A. SMITH, of Boston, in the county of Suffolk and State of Massachusetts, have invented certain new and useful Improvements in Faucets, of which the following is a specification.

This invention relates to improvements in faucets, and more especially to improvements in that class of faucets which are used in drawing malted liquids—such as beer, ale, and similar liquids; and it has for its object to provide means whereby the faucet can be easily removed from the discharge-pipe to which it is attached, can be easily repaired in order to keep it tight and in order and to otherwise improve faucets of this class, as will be understood by the complete description of the device herein contained.

The invention consists of the novel construction, arrangement, and combination of parts fully described hereinafter and particularly set forth in the claims annexed hereto; and it is carried out substantially as illustrated on the accompanying drawings, which form an essential part of this specification, and whereon like characters of reference refer to like parts wherever they occur on the different parts of the drawings.

On the drawings, Figure 1 represents a side elevation of my improved faucet. Fig. 2 represents a central longitudinal section of the faucet shown in Fig. 1. Fig. 3 represents a detail longitudinal section of the inner portion of the casing of the faucet, showing the outer portion of the casing removed therefrom and also showing the means whereby a hose may be attached to the same.

The body or casing of the faucet is made in two parts, an inner portion 1, which is secured to the discharge-pipe through which the liquid passes on its way to the faucet in any suitable manner, but preferably by means of the well-known form of coupling screwed upon the screw-threaded end of the portion 1, and said body or casing is made with an outer portion 2, which forms the casing of the faucet proper.

The portion 1 of the casing is firmly secured to the back board 3 of a bar or in any other desired position in which the faucet is to be used, preferably by means of the nut 4, which is screwed upon the screw-threaded end of said portion 1. The outer end of the portion 1 of the casing is flanged, and the face of the flange thereon is provided with a recess or chamber 5 for a purpose to be understood by the complete description of the device. The face of the flange on the portion 1 of the casing is also provided with projecting bolts or studs 6 6, which receive the flanged inner end of the portion 2 of the casing and by means of which the two parts of the casing are firmly secured to each other, said bolts or studs being screw-threaded and provided with the nuts 7 7 substantially as shown; but the two parts of the casing may be secured together in any other and well-known manner, if so desired.

Between the flanges on the portions 1 and 2 of the casing is preferably inserted a perforated strainer 8, which is held firmly in place by means of the flanges and which strainer acts to strain all of the liquid which passes through the faucet. This strainer is easily removed whenever it is desired to clean or to renew the same. The outer end of the portion 1 of the casing is provided with an internal screw-threaded portion 9 to receive the male portion 10 of the coupling 11 on a hose or pipe used to supply water or other cleansing liquid under pressure and which may be forced downward through the discharge-pipe in order to wash said pipe, the pipe preferably being first disconnected from the receptacle containing the liquid.

The portion 2 of the casing is provided with the perforated partition 12, through which the liquid passes while being drawn from the faucet. The perforation in this partition 12 is controlled by the valve 13, which is so arranged as to be closed by a movement in the direction of the flow of the liquid through said faucet while it is being drawn. This valve is mounted upon the valve-stem 14, which is guided through a stuffing-box 15 in the casing, substantially as shown in Fig. 2.

The outer end of the valve-stem 14 is provided with a slotted perforation 16, which receives the lower end of a lever 17, said lever being pivotally mounted at 18 upon the casing and forming a handle by which the valve is operated.

The portion 2 of the casing is provided with an outlet-passage 19, through which the liquid is discharged from the faucet when the valve is opened.

The operation of this my improved faucet is substantially as follows: With the parts of the faucet in the positions as shown in Fig. 2, the liquid under pressure in the discharge-pipe and in the portion 1 of the casing presses against the valve 13 in such a manner as to tend to hold the valve upon its seat and to prevent the flow of the liquid through said faucet, and the portion of the liquid which is between the valve 13 and the strainer 8 has been strained by passing through said strainer, leaving said liquid free from particles of hops or other solid matter. If it is desired to draw the liquid from the faucet, the person turns the upper end of the handle-lever 17 forward, and thereby causes its lower end to move within the slotted perforation in the valve-stem and by engaging the wall at the opposite end of said perforation to move the valve-stem 14 and its attached valve 13 backward against the pressure of the liquid in the discharge-pipe. This movement of the valve causes it to leave its seat upon the perforation in the partition 12 and allows the liquid to flow freely through the faucet and out of the discharge-passage 19 into a tumbler or other article held in position to catch said liquid. When sufficient of the liquid has been drawn, the person has only to move the upper end of the handle-lever 17 backward to the position shown on the drawing, and thereby cause its lower end to engage the forward wall of the perforation in the valve-stem 14, so as to move the valve-stem and its attached valve into such positions as to allow the pressure of the liquid to again force the valve against its seat, thus closing the faucet and preventing any further flow of the liquid from the same.

It will be understood that the stuffing-box 15 prevents the escape of the liquid from around the outer end of the valve-stem while the liquid is being drawn through the faucet.

By having the valve seated in the direction of the flow of the liquid through the faucet it will be seen that the pressure of the liquid against the valve tends to keep the valve tight.

If it is desired to wash the discharge-pipe, it is only necessary to remove the liquid from the discharge-pipe either by returning it to the supply-receptacle from which it is to be drawn or by disconnecting the discharge-pipe from said supply-receptacle and allowing the liquid which is in the discharge-pipe to flow out of the pipe and be wasted. After the discharge-pipe has been emptied the portion 2 can be disconnected from the portion 1 of the casing and the coupling member 11 of a hose be attached to the internal threaded end of the perforation through the portion 1, thus allowing the water or other cleansing liquid from the hose to be forced through the perforation in the portion 1 of the casing and downward through the discharge-pipe to clean the same.

Having thus fully described the nature, construction, and arrangement of my invention, I wish to secure by Letters Patent and to claim—

1. In a faucet for drawing malted liquids, a casing made in two parts, the inner part flanged on its outer end and screw-threaded on the exterior of its inner end to allow it to be clamped in position, said inner part of the casing screw-threaded on the interior of its outer end to receive a screw-threaded coupling, the outer part of the casing flanged on its inner end to fit the flange on the inner part of the casing, means to clamp the two parts of the casing firmly together, the outer part of the casing chambered and provided with a nozzle in free communication with the chamber therein, a perforated partition with a valve-seat thereon dividing the chamber in the outer part of the casing, a valve controlling the perforation in said partition and closed by the pressure of the liquid controlled by said valve, a valve-stem on said valve, slotted at its outer end, a stuffing-box through which the valve-stem passes, a handle-lever fulcrumed to the casing and entering the slot in the end of the valve-stem, whereby the valve may be moved longitudinally in both directions by the manipulations of said lever, and a weight on said handle-lever normally holding the valve closed.

2. In a faucet of the class described, a casing made in two parts separable from each other, a valve within and controlling the flow of liquid through the outer part of the casing, and means to attach a hose-coupling to the inner portion of the casing.

In testimony whereof I have affixed my signature in presence of two witnesses.

CHARLES A. SMITH.

Witnesses:
 MAY F. FULLER,
 HENRY CHADBOURN.